United States Patent [19]

Krall et al.

[11] Patent Number: 5,704,507
[45] Date of Patent: Jan. 6, 1998

[54] PLASTIC CONTAINER WITH INTEGRAL FLEXIBLE HANDLE

[75] Inventors: Thomas J. Krall, Toledo, Ohio; Christopher T. Evans, Long Valley, N.J.

[73] Assignee: Owens-Brockway Plastic Products Inc., Toledo, Ohio

[21] Appl. No.: 532,130

[22] Filed: Sep. 22, 1995

(Under 37 CFR 1.47)

[51] Int. Cl.⁶ ........................................ B65D 23/10
[52] U.S. Cl. ............... 215/398; 215/44; 215/379; 220/755; 220/756; 220/769; 220/771; 222/465.1; 264/539; 425/525
[58] Field of Search ............... 229/402; 215/379, 215/396, 398, 44, 40, 397; 222/465.1; 220/752, 755, 756, 768, 769, 771; 264/531, 533, 539, 516; 425/525

[56] References Cited

U.S. PATENT DOCUMENTS

| | | | |
|---|---|---|---|
| 2,911,673 | 11/1959 | Soubier . | |
| 3,773,249 | 11/1973 | Hidding | 215/398 X |
| 4,280,247 | 7/1981 | Burzen et al. | 190/115 X |
| 4,280,630 | 7/1981 | Hafele | 215/398 |
| 4,280,859 | 7/1981 | Thompson | 215/398 X |
| 4,311,246 | 1/1982 | Saito et al. | 215/398 |
| 4,439,393 | 3/1984 | Saito et al. | 425/525 X |
| 4,604,044 | 8/1986 | Hafele | 425/525 |
| 4,629,598 | 12/1986 | Thompson | 215/398 X |
| 4,830,234 | 5/1989 | Odet | 222/465.1 |
| 5,057,266 | 10/1991 | Belcher | 425/525 X |
| 5,275,780 | 1/1994 | Robinson | 425/525 X |
| 5,383,779 | 1/1995 | Robinson | 425/525 |
| 5,487,482 | 1/1996 | Rocheleau | 270/796 X |
| 5,508,076 | 4/1996 | Bright | 215/396 X |

*Primary Examiner*—Allan N. Shoap
*Assistant Examiner*—Robin A. Hylton

[57] ABSTRACT

A plastic container comprising hollow plastic body including a side wall, a base wall, a shoulder, an integral neck and an integral finish on the upper end of the neck. An integral laterally extending flexible handle is provided on the neck below the threads or the like that are positioned on the neck for receiving a closure. The handle may be of a number of configurations including a T-shape or annular bail-type shape. A method and apparatus for making the container comprises injecting, extruding and blowing wherein the finish and the integral handle are first injection molded and thereafter the neck and body are formed by extrusion of plastic integrally with the finish followed by blow molding of the hollow container.

1 Claim, 2 Drawing Sheets

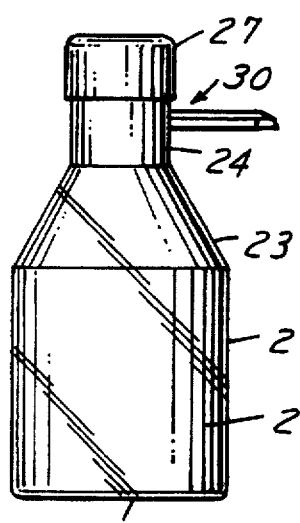
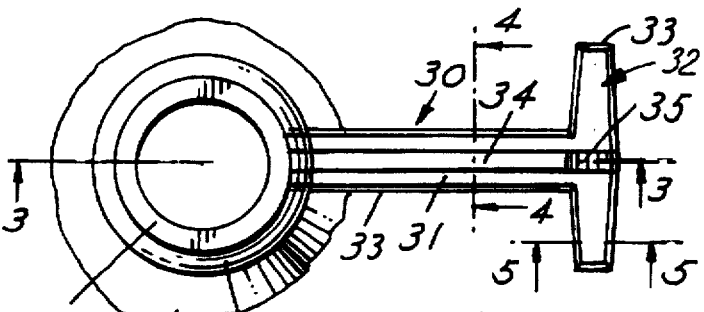
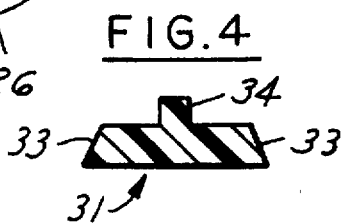
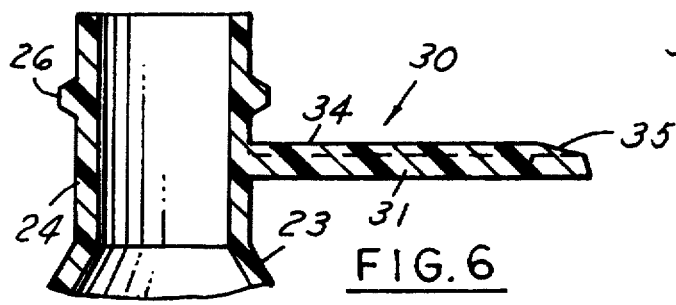
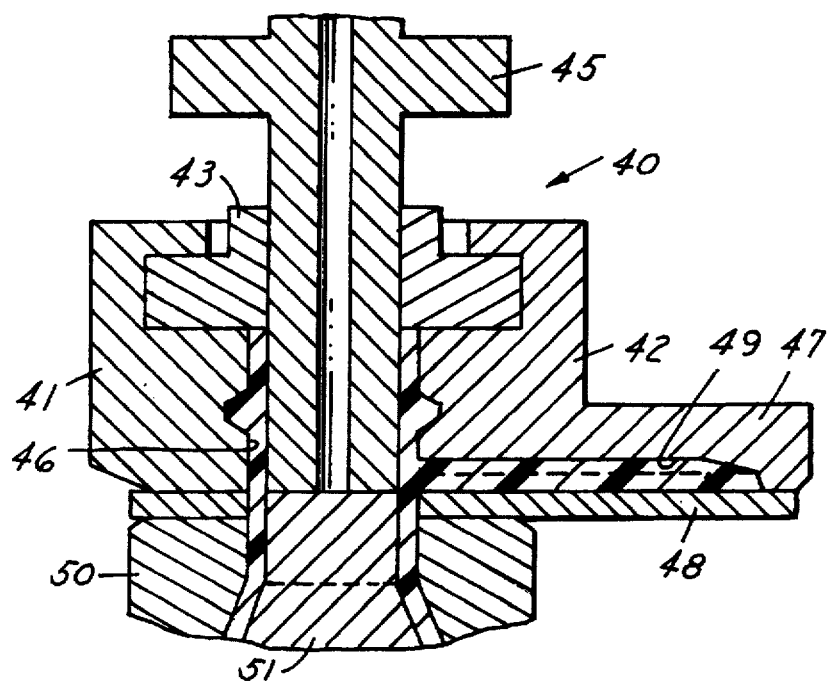

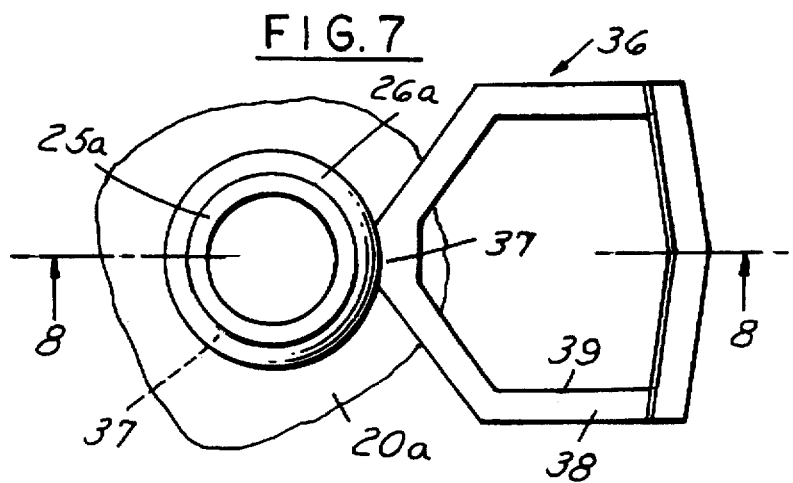
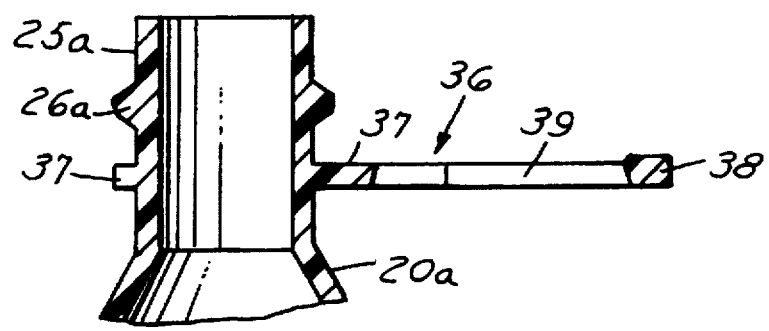
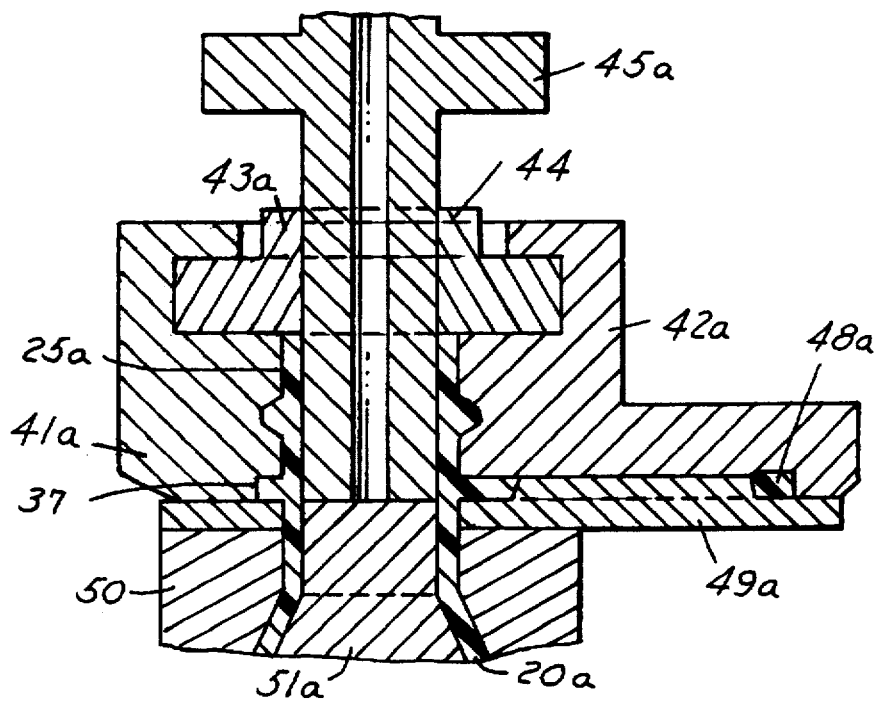

PLASTIC CONTAINER WITH INTEGRAL FLEXIBLE HANDLE

This invention relates to plastic containers and particularly to plastic containers which have a handle on the upper end to facilitate handling of the container.

BACKGROUND AND SUMMARY OF THE INVENTION

In certain types of hollow plastic containers, it is conventional to add a handle which is snapped into position below the neck of the container for supporting the container from the upper end, for example, in decanting the contents while controlling the decanting.

Among the objectives of the present invention are to provide a plastic container having an integral flexible handle which is less complex and relatively inexpensive; which can be readily made; and to provide a method and apparatus for making such a container.

In accordance with the invention, the plastic container comprises a hollow plastic body including a side wall, a base wall, a shoulder, an integral neck and an integral finish on the upper end of the neck. An integral laterally extending flexible handle is provided on the neck below the threads or the like that are positioned on the neck for receiving a closure. The handle may be of a number of configurations including a T-shape or annular bail-type shape. The method and apparatus for making the container comprises injecting, extruding and blowing wherein the finish and the integral handle are first injection molded and thereafter the neck and body are formed by extrusion of plastic integrally with the finish followed by blow molding of the hollow container.

DESCRIPTION OF THE DRAWINGS

FIG. 1 is an elevational view of a plastic container embodying the invention.

FIG. 2 is a fragmentary plan view of a portion of the container.

FIG. 3 is a sectional view taken along the line 3—3 in FIG. 2.

FIG. 4 is a sectional view taken along the line 4—4 in FIG. 2.

FIG. 5 is a sectional view taken along the line 5—5 in FIG. 2.

FIG. 6 is a fragmentary sectional view of a portion of an apparatus for forming the container.

FIG. 7 is a fragmentary view similar to FIG. 2 of a modified form of the container.

FIG. 8 is a sectional view taken along the line 8—8 in FIG. 7.

FIG. 9 is a vertical sectional view of a portion of an apparatus forming the container shown in FIGS. 7 and 8.

DESCRIPTION OF THE PREFERRED EMBODIMENT

Referring to FIGS. 1–5, in accordance with the invention, a plastic container comprises a hollow plastic body 20 including a side wall 21, a base wall 22, a shoulder 23, an integral neck 24 and an integral finish 25 on the upper end of the neck 24. An integral laterally extending flexible handle 30 is provided on the neck 24 below the threads 26 or the like that are positioned on the neck for receiving a closure 27. The handle 30 may be of a number of configurations including a T-shape or annular bail-type shape.

In the form shown in FIGS. 1–5, the handle 30 is T-shaped and includes an integral radial arm 31 and an integral cross arm 32 at its outer end. The sides 33 of arm 31 are inclined such that the arm 31 is trapezoidal in cross section. The integral arm 31 has an integral longitudinal rib 34. The cross section of cross arm 32 is generally trapezoidal.

The method for making the container comprises an injection, extrude and blow apparatus wherein the finish 25 and the integral handle 30 are first injection molded and thereafter the neck 24 and body 20 are formed by extrusion of plastic tube integrally with the finish followed by blow molding of the hollow container in a mold that is closed about the tube. Such a method is shown in U.S. Pat. No. 2,911,673, incorporated herein by reference.

In a typical apparatus 40 as shown in FIG. 6, a split neck ring 41, 42, finish insert 43, core 45, bushing extension 48, bushing 50 and extension tip 51 define the cavity 49 for forming the finish and handle.

In the form shown in FIGS. 7–8, the handle 36 is in the form of an integral bail, corresponding portions having the same numbers with the suffix "a".

An apparatus for making the form shown in FIGS. 7–8 is shown in FIG. 9 and similar to that shown in FIG. 6, similar parts having the same numbers with the suffix "a".

It can thus be seen that there has been provided a plastic container having an integral flexible handle which is less complex and relatively inexpensive; which can be readily made; and a method and apparatus for making such a container.

What is claimed is:

1. A plastic container comprising:

a hollow plastic body having an integral neck and finish, integral means on said neck for attachment of a closure, an integral flexible handle extending radially outwardly from the lower end of said finish, said handle lying substantially in a single plane and terminating in a gripping portion, said gripping portion being T-shaped, said handle including a radial arm that has a trapezoidal cross section and extends to said gripping portion, said gripping portion having a trapezoidal cross section, said radial arm having an integral longitudinal rib thereon on the surface thereof adjacent said finish.

* * * * *